Jan. 2, 1968  L. L. MESLER ETAL  3,361,901

ROTATABLE HEADLAMP ASSEMBLY

Filed June 10, 1966

INVENTORS
Leon L. Mesler, &
BY Harry L. Pierce, Jr.

E. J. Biskup
ATTORNEY

United States Patent Office 3,361,901
Patented Jan. 2, 1968

3,361,901
ROTATABLE HEADLAMP ASSEMBLY
Leon L. Mesler, Grand Blanc, and Harry L. Pierce, Jr., Fenton, Mich., assignors to General Motors Corporation, Detroit, Mich., a corporation of Delaware
Filed June 10, 1966, Ser. No. 556,675
11 Claims. (Cl. 240—7.1)

This invention relates to lamp assemblies and more particularly to an actuating mechanism for a motor vehicle rotatable headlamp assembly.

According to the invention, headlamp sub-assemblies are rotatably supported at opposite sides of the vehicle in a manner which permits the lamps to be hidden when in the raised position and to be exposed in front of or as a part of the radiator grille when in the lowered position. The headlamp sub-assemblies are rotated between the two positions by means of a reversible drive motor which is connected through a suitable gear train and drive shaft to flexible torque shafts which are adapted to rotate the headlamp sub-assemblies between positioning stops. Means are provided to turn the drive shaft through an angle greater than the angle through which the headlamp sub-assemblies turn thus torsionally winding the torque shafts so they exert torque loads sufficient to hold the head-lamp sub-assemblies in secure engagement with the stops. A non-reversing feature in the gear train prevents the torque shafts from unwinding.

One feature of this invention is that it provides actuation mechanism for rotating a lamp assembly between two predetermined positions.

Another feature of the invention lies in the provision of flexible torque shafts which are torsionally wound at the end of each lamp positioning cycle to exert a torque load on the lamp assembly and thus hold it in the selected position.

Yet another feature is the provision of self-locking means for keeping the torque shafts torsionally wound after the lamp assembly has been selectively positioned.

These and other features of the invention will be made apparent in the following description taken in connection with the accompaying drawings wherein.

Figure 1:
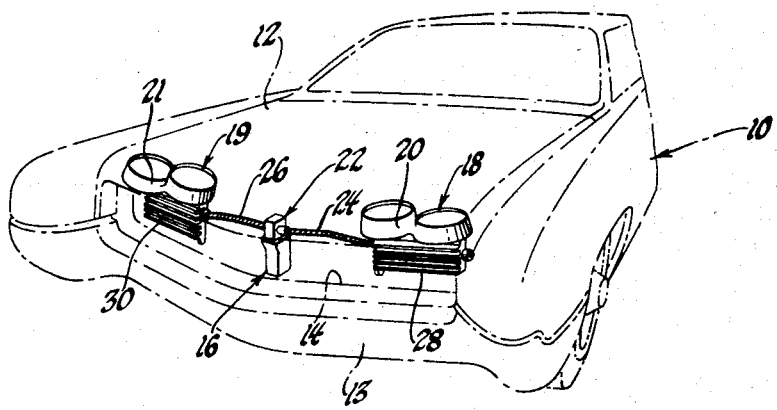
FIGURE 1 is a perspective view of the front portion of a motor vehicle incorporating the invention.

Referring to the drawings, and in particular to FIGURE 1, there is shown in outline form a motor vehicle 10 of conventional design having a hinged, liftable hood 12, front bumper 13 and radiator grille opening 14. The radiator grille normally positioned in the opening 14 has been removed to reveal a rotatable headlamp assembly 16 made according to this invention. The headlamp assembly 16 is rotatable between a lamp raised position, seen in FIGURE 1, in which the lamps are rotated into a hidden position beneath the hood, and a lowered position wherein the lamps are rotated forwardly and downwardly from the position shown in FIGURE 1 to a horizontal, exposed position in front of the radiator grille for illuminating the roadway in the normal manner.

The lamp assembly 16 comprises left and right lamp sub-assemblies 18 and 19 including dual headlamp capsules 20 and 21, an actuator 22 for rotating the lamp sub-assemblies 18 and 19 between raised and lowered positions, and flexible torque shafts 24 and 26 which connect the lamp sub-assemblies 18 and 19, respectively, to the actuator 22. As seen in FIGURE 1, the lamp sub-assemblies 18 and 19 include attached radiator grille portions 28 and 30 which are rotatable therewith and form a part of the fixed portion of the radiator grille when the lamps are in the raised position.

Figure 2:
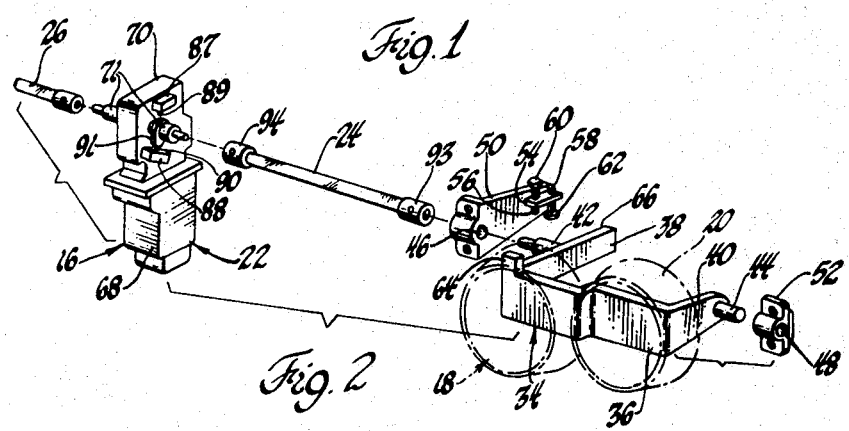
FIGURE 2 is an enlarged exploded view of a portion of the lamp assembly and actuator mechanism.

The lamp sub-assembly 18, shown in detached form in FIGURE 2, includes a mounting trunnion or generally U-shaped frame 34. A front plate 36 supports the headlamp capsule 20 while parallel end rails 38 and 40 mount stub shaft members 42 and 44 which are rotatably supported within bearing surfaces 46 and 48 of support brackets 50 and 52 respectively. Support brackets 50 and 52 are suitably attached to the inner surface of the radiator grille or other suitable vehicle support structure. A horizontally disposed flange 54 extends from bracket 50 adjacent frame 34 and has vertically orientated stop members 56 and 58 threadably received therein with oppositely disposed stop surfaces 60 and 62 which are adapted to engage positioning surfaces 64 and 66 on frame 34. When frame 34 is rotated so that surface 64 engages stop surface 60 it will be observed that the lamp sub-assembly 18 is in the hidden or raised position while engagement of surface 66 with stop surface 62 locates the lamp sub-assembly 18 in the exposed or lowered position. When the lamp sub-assembly is moved between positioning stops, the frame 34 is rotated through an angle of predetermined size. In a preferred embodiment, this angle is approximately 88°.

The stop members 56 and 58 are preferably vertically adjustable relative to the flange member 54 and include suitable means, such as lock nuts, to prevent their accidental movement once adjusted. Thus, it will be apparent that the terminal or stop positions of frame 34 can be varied a limited degree by adjusting the stop members 56 and 58 relative to the flange to vary the engagement positions of surfaces 62, 66 and 60, 64. The members 56 and 58 should be simultaneously adjusted so as to maintain the angular rotation of frame 34 relatively constant for reasons which will become clear as the description proceeds.

Actuator 22 includes a conventional reversible 12 volt D-C series wound motor 68 and a gear box 70 above the motor. The actuator 22 is adapted to be attached to the inner surface of the radiator grille in a conventional manner at a point intermediate the lamp sub-assemblies 18 and 19. As seen schematically in FIGURE 4, the gear box 70 includes a double speed reduction gear train consisting of paired worm and wheel gear sets which transmit the torque output of the motor 68 to a double-ended output shaft 71. The gear arrangement includes worm 72 which is formed at one end of the motor armature shaft 74 and drives a first stage worm wheel 76. The worm wheel 76 is affixed to an intermediate shaft 78 which further includes a worm 80 for driving a second stage worm wheel 82 affixed to the output shaft 71.

Figure 3:
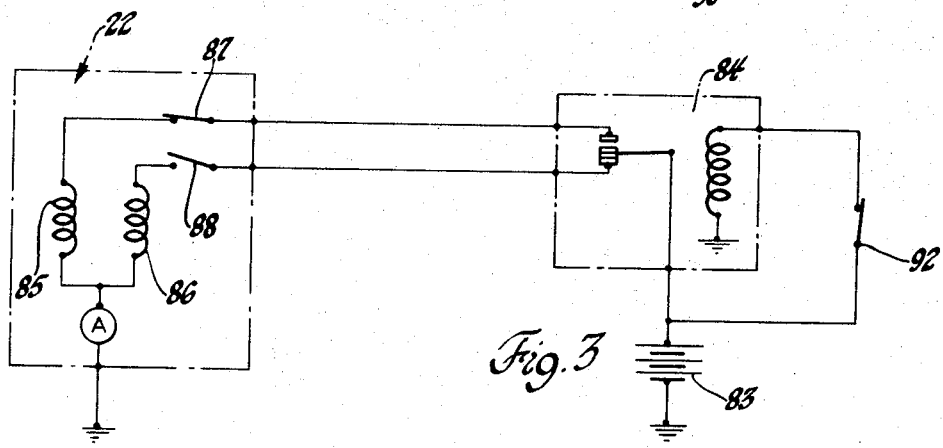
FIGURE 3 is a diagrammatic view of the actuator electrical circuit.

One example of an electrical circuit for energizing the motor 68 is shown diagrammatically in FIGURE 3. This circuit includes a power source 83 and a double-throw relay 84 through which the proper field 85 or 86 of the motor 68 is selected for clockwise or counter-clockwise rotation of the output shaft 71. The circuit further includes limit-switches 87 and 88 which are normally closed but are selectively opened to automatically de-energize the motor 68 after it has turned the output shaft 71 through a predetermined angle of approximately 118°. As seen in FIGURE 2, the limit-switches 87 and 88 are exteriorly mounted on the gear box 70 at angularly spaced points about the output shaft 71 and each has an external plunger 89 and 90, respectively, which may be depressed to open the switch contacts. The angular spacing of plungers 89 and 90 corresponds to the angle of rotation of shaft 71. Switches 87 and 88 are operated by a cam 91 pressed on the output shaft 71 which, as it rotates therewith, engages the plungers 89 and 90. Thus, if field 86 is energized across switch 88, it may be seen that the circuit will be opened when cam 91 engages plunger 90 and the motor de-energized. The circuit is preferably controlled by a headlight switch 92 conveniently located on the vehicle instrument panel near the operator. When the switch 92 is closed to turn the headlamps on, the lamp sub-assemblies 18 and 19 are rotated to the lowered position, and when the switch 92 is opened to turn the headlamps off the sub-assemblies are automatically rotated to the raised position. While not shown in the drawing, the switch 92, if preferred, may be a separate switch independent of the headlight switch. In such case, the relay 84 need not be used.

The flexible torque shaft 24 includes ferrules 93 and 94 which are rigidly mounted on opposite ends thereof and are adapted to be secured to suitably formed end portions of shafts 42 and 71. As aforementioned, the frame 34 is limited to an angular movement of 88° between positioning stops 56 and 58 while the output shaft 71 rotates through an angle of 118° before the motor is de-energized. Therefore, the opposite ends of shaft 24, which are attached to the frame 34 and the output shaft 71 by the ferrules 93 and 94, respectively, will turn through unequal angles of 88° and 118° as a result of which the shaft 24 will be torsionally wound. Shaft wind-up causes a torque load to be exerted on the frame 34 through shaft 42 to hold the lamp sub-assembly 18 in place against either of the stop surfaces 60 or 62. As the lamp sub-assembly is rotated from one stop surface to the other, one half or 15° of the 30° angular differential of rotation of shaft ends, is needed to unwind the torque shaft 24 while the remaining 15° is utilized to wind the shaft at the other end of travel.

The torque load achieved by imposing a torsional stress in a particular shaft is, of course, dependent upon the physical characteristics of the torque shaft used. Accordingly, for best results the shaft employed in the present invention should exhibit bi-directional characteristics that are identical, or at least nearly so. The number of strands of wire used in the shaft and their lay should be controlled in order that the proper torque load is produced when the shaft is deflected a specified amount. In the preferred form of the invention, the shaft 24 consists of several layers of alternately wound steel cable of a predetermined gage such that a torque load of approximately 120–180 lb.-in. is achieved when the shaft is torsionally deflected or wound 15° in both clockwise and counter-clockwise directions.

Figure 4:
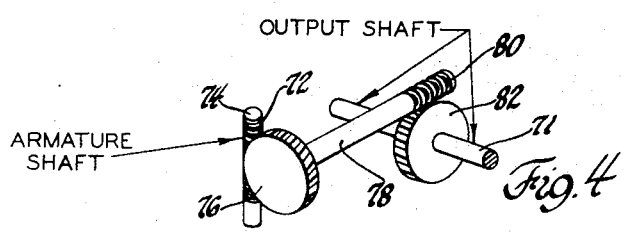
FIGURE 4 is a schematic view of the actuator gear train.

To prevent unwinding of the shaft 24 through a back-up of the gear train with resulting loss of load on the lamp sub-assembly, a non-reversible or self-locking feature is incorporated into the gear train shown in FIGURE 4 and described above. The design requirements of a non-reversible worm gear set wherein the worm drives the wheel are well known in the gearing art and therefore details of the gear construction are not thought necessary here. It will be understood, however, that such gears are non-reversible if the lead angle of the worm is less than the friction angle of the gear surfaces in contact. Thus as seen in FIGURES 1 and 4, it will be apparent that the torque shaft 24, which is attached to shaft 71 is prevented from unwinding through a back-up of the gear train because of the self-locking action of worm 72 and wheel 76. The wound shaft 24 therefore continues to exert a torque load on the frame 34 until the motor is activated to reposition the lamp assembly 16.

It will be understood that the structure of lamp sub-assembly 19 is the same as that of lamp sub-assembly 18 and therefore only one has been here described in detail. The lamp sub-assembly 19 is connected to the other end of double-ended output shaft 71 by the flexible torque shaft 26, which is identical to shaft 24. The lamp sub-assemblies 18 and 19 function as a unit and thus are simultaneously rotated between the raised and lowered positions.

Various changes and modifications can be made in this construction without departing from the spirit of the invention. Such changes and modifications are contemplated by the inventor and he does not wish to be limited except by the scope of the appended claims.

What is claimed is:

1. Actuation mechanism comprising, a drive shaft, reversible drive means connected to said drive shaft for turning said drive shaft through a predetermined angle in both clockwise and counter-clockwise directions, a flexible torque shaft having one end portion attached to said drive shaft and rotatable therewith, a support frame rotatable between two angularly spaced positions, said frame being attached to the other end portion of said torque shaft for rotation therewith, the angle between said two positions being less than the angle through which said drive shaft rotates, whereby the latter torsionally winds said torque shaft and applies a torque load to said frame to hold said frame in each of said positions, and lock means to prevent said torque shaft from unwinding.

2. A rotatable lamp assembly for a motor vehicle comprising, a frame rotatably supported on the vehicle, a lamp fixture attached to said frame, said frame being adapted to rotate a predetermined angular distance between two positions, a drive shaft, a reversible drive motor for rotating said drive shaft through a predetermined angle greater than the angle through which said frame rotates, means connecting said drive motor to said drive shaft, means for energizing said motor, means for de-energizing said motor after said drive shaft has rotated through said predetermined angle, a torque shaft having end portions fixedly secured to and rotatable with said drive shaft and said frame for transmitting torque to said frame to rotate said frame between said two positions, whereby the unequal rotation of said torque shaft end portions produces a torsional wind-up of said torque shaft with a resultant torque load applied to said frame to hold said frame in each of said positions, and lock means for preventing said torque shaft from unwinding until said drive motor is energized to turn said drive shaft in the reverse direction.

3. The invention recited in claim 2 wherein said means connecting said motor to said drive shaft includes a worm and wheel gear drive.

4. The invention recited in claim 3 wherein said worm and wheel gear drive is non-reversible for preventing said torque shaft from unwinding.

5. The invention recited in claim 2 wherein adjustable stop members are provided to alter the position of said frame in either of the said two positions.

6. The invention recited in claim 2 wherein said motor is energized by an electrical circuit including a source of power, a relay switch for selecting the proper field of the motor, and a circuit control switch.

7. The invention recited in claim 6 wherein said electrical circuit includes a pair of limit switches, said swtches comprsing the means for de-energizing said motor.

8. The invention recited in claim 7 wherein said limit switches are operated by a cam rotatable with said drive shaft.

9. The invention recited in claim 6 wherein said circuit control switch is the vehicle headlight switch.

10. A rotatable lamp assembly for a motor vehicle comprising, a drive shaft, reversible drive means connected to said drive shaft for turning said drive shaft through a predetermined angle in both clockwise and counter-clockwise directions, a flexible torque shaft having one end portion attached to said drive shaft and rotatable therewith, a lamp support frame rotatably supported on the the vehicle, said frame being attached to the other end portion of said torque shaft and rotatable therewith, stop members on the vehicle engageable by said frame for positioning said frame in lamp exposed and lamp hidden positions, the angle between said stop members being less than the angle through which said drive shaft rotates whereby the latter torsionally winds said torque shaft and applies a torque load to said frame to hold said frame against the engaged stop member, and lock means to prevent said torque shaft from unwinding.

11. Actuation mechanism for rotating the headlamps of a motor vehicle between an exposed position and a hidden position comprising, headlamp support trunnions rotatably supported on opposite sides of the vehicle, a reversible drive motor, a non-reversible worm and wheel gear drive operated from the drive shaft of said motor, a double-ended output shaft turned by said motor through said gear drive, a pair of flexible torque shafts, each of said torque shafts having one end attached to one end of said output shaft and a second end attached to one of said trunnions and capable of rotating said trunnion in clockwise and counter-clockwise directions, stops for limiting rotational movement of said trunnions, means for energizing said motor, means for de-energizing said motor after it has turned said output shaft through an angle greater than the angle through which said trunnions have turned between stops, said additional angular movement of said output shaft producing a wrap-up of said flexible torque shafts for applying torque loads to said trunnions to hold said trunnions in immovable position against said stops.

References Cited
UNITED STATES PATENTS 3,325,636   6/1967   Roberts et al. _____ 240—7.1

JOHN M. HORAN, *Primary Examiner.*

NORTON ANSHER, *Examiner.*

D. L. JACOBSON, *Assistant Examiner.*